April 22, 1958  W. MAURER  2,831,240
COMPOUND DUPLEX CUTTING TOOL BIT
Filed May 16, 1955
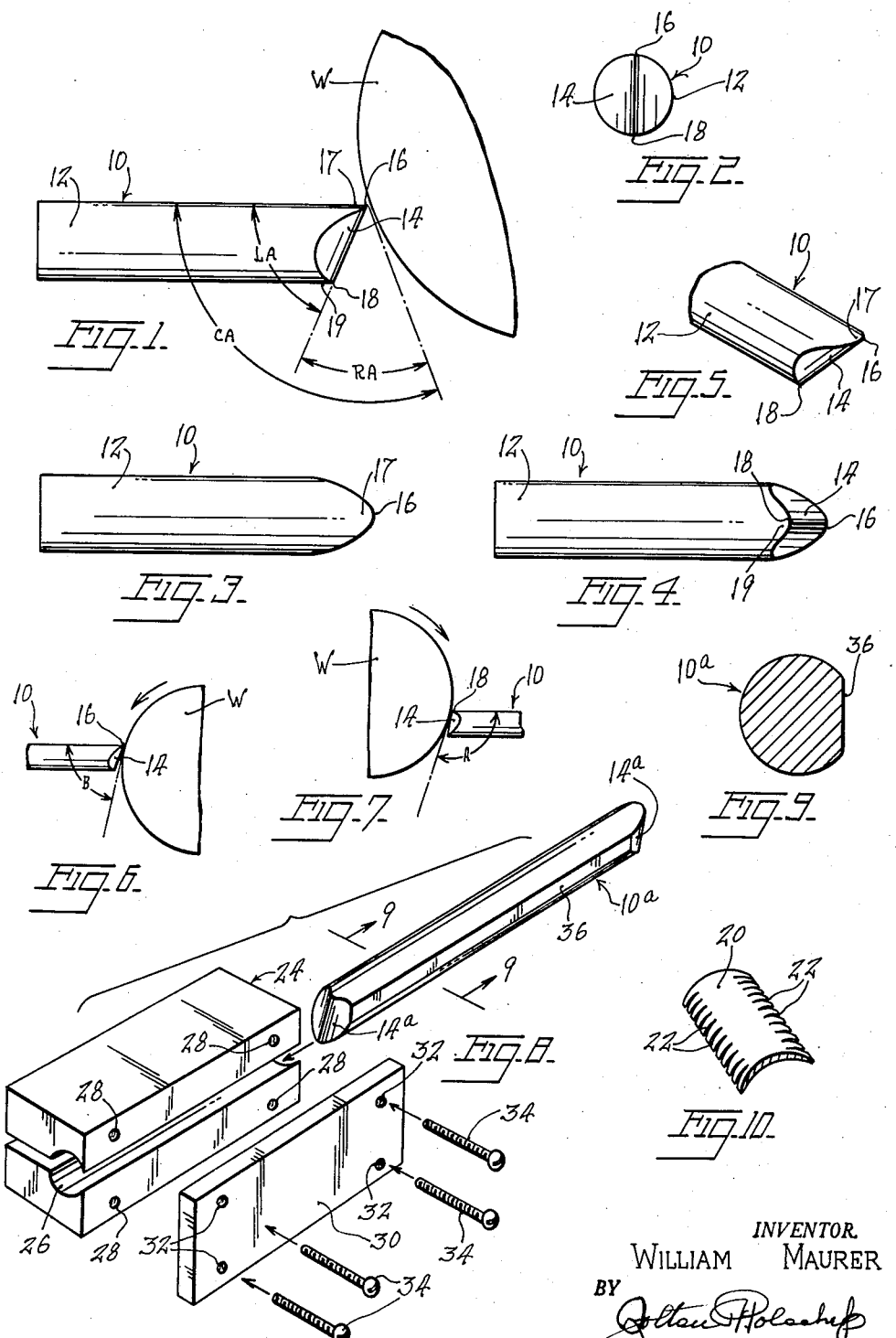
INVENTOR.
WILLIAM MAURER
BY
*Jolton Holochuck*
ATTORNEY

United States Patent Office 2,831,240
Patented Apr. 22, 1958

2,831,240

COMPOUND DUPLEX CUTTING TOOL BIT

William Maurer, Queens Village, N. Y.

Application May 16, 1955, Serial No. 508,482

2 Claims. (Cl. 29—95)

This invention relates to tool bits such as those used as thread cutting devices or devices for otherwise machining bar stock on lathes and like structures, to form shoulders, to mill groves, and to perform related operations on said stock.

One of the undesirable characteristics of tool bits as conventionally made resides in the formation of a continuous, elongated chip, which chip interferes with proper operation of the machine, and prevents the work from being completed as accurately and as efficiently as is desirable. In this connection, most tool bits are provided with a straight edge at the point of contact. Said edge is flat, and a chip formed thereby becomes so wide that the machine tends to vibrate, thereby placing the machine under considerable stress and resulting not only in inaccurate work, but also in damaging of the stock and/or of the tool bit.

Further, a true chip control is not provided by conventional tool bits, and little thought has been given to the formation of a tool bit in such a way as to cause the same to produce a particular type of work while at the same time forming the resultant chip in any desired manner. Thus, in accordance with the present invention it is proposed to so design a tool bit as to produce a chip of any selected shape, that will break at intervals to move clear of the work, without the help of a chip breaker.

Yet another object of importance is to provide a tool bit which will be particularly shaped in such a manner as to relieve the machine on which it is used of all excessive stresses and strains.

By way of background, it may be noted that conventional tool bit construction is such that certain operational and structural deficiencies, well known in the art, have become evident. Among these are built-up edge, cratering, and the necessity in many instances of using chip breakers or curlers.

As to built-up edge, when soft, ductile metal is cut, a small quantity of material collects or is built up on the face of the cutting edge, adhering strongly thereto. This is the built-up edge, and when this condition arises, the cutting edge does no cutting itself, but in actuality supports the built-up edge which does the cutting, said edge thus becoming an actual part of the tool during the cutting. Rough finished surfaces result, since fragments of the built-up edge escape with the work under the tool point, marring the surface and leaving it rough.

As to cratering, a crater may develop just to the rear and to one side of the cutting edge of a conventional bit, as a result of abrasion by the chip coming from the work. As the cutting action continues, the crater increases in width and depth, and when its edge approaches the cutting edge of the tool, the tool weakens and the edge breaks out, bringing about sudden tool failure. Cratering is most noticeable when turning tough, strong, alloy steel, stainless steel, and Monel metal.

With respect to the use of chip breakers or curlers, when steel is machined at high speeds with single point carbide tools, continuous chips are produced at a very fast rate. The chips are dangerous to the operator and are difficult to handle, and if allowed to go in any direction, may become wound around the revolving work, whipping against the cutting edge and chipping it. As a result, it is common practice to grind a chip breaker or chip curler into the surface of the tool, for the purpose of coiling the chips into spring-like curls, breaking them against the tool or the work itself, or breaking them by means of a mechanical breaker above the tool. Chip breakers or curlers are considered troublesome, and are obstructions in the natural path of travel of the chip on its way to its disposal area. It has been found that they definitely interfere with the free cutting action of the tool, and are expensive to maintain, inasmuch as they must be reground or readjusted with each resharpening of the tool bit.

Accordingly, it is an object of considerable importance in the invention to provide a tool bit so shaped on its cutting face and having a cutting edge so shaped, as to eliminate completely cratering, built-up edge, and the necessity of formation of a chip breaker or curler.

Still another object of importance is to provide a tool bit which will be characterized by the steadiness and rigidity thereof while the same is in use. By reason of this characteristic it is proposed to facilitate the use of carbide inserts on the tool bits, it being extremely important, in a carbide-tipped tool, that the tool be held with complete rigidity and steadiness. Solid carbide bits can also be used, or bits of other material such as H. S. steel or cast alloy.

Still another object is to provide a tool bit as stated which will form a chip of such a shape as to produce substantially less friction than has heretofore been the case, and that will not interfere with following chips coming off the stock.

Yet another object of importance is to provide a device of the type stated which will be far cheaper to produce in a round or cylindrical shape, than has been true of conventional devices used for the same purpose. Other shapes are optional.

Further objects of importance are to provide a tool bit as stated which can be readily formed as a double side tool bit, with a double edge, can be made to fit any tool adapter, will have a convex cutting edge on all types of tool bits, will be designed to facilitate twisting of the tool bit when the work-engaging edge is round and is held in a rack end, will be adapted to produce two or more chips simultaneously due to the provision of the rounded cutting edge on the tool bit, and will be designed to produce a ball of chips instead of a long, continuous chip, it being well known that a long, continuous chip frequently produces injury to the worker performing the operation or to other workers located nearby, particularly when machining tough alloy steels on a continuous bit.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a view in side elevation of a tool bit formed according to the present invention, a work piece to which the tool is applied being illustrated fragmentarily and somewhat diagrammatically.

Fig. 2 is an end elevational view of the bit as seen from the right of Fig. 1.

Fig. 3 is a top plan view of the bit.

Fig. 4 is a bottom plan view.

Fig. 5 is a fragmentary perspective view.

Figs. 6 and 7 are somewhat diagrammatic views similar to Fig. 1 showing positive and negative applications of the bit to the work.

Fig. 8 is an exploded perspective view showing a modified form of bit and an associated holder.

Fig. 9 is an enlarged transverse sectional view through the modified bit on line 9—9 of Fig. 8.

Fig. 10 is a fragmentary perspective view of a chip formed by use of the bit.

In Figs. 1–5, there is shown a tool bit generally designated 10 formed according to the present invention. The tool bit is formed as a cylindrical body 12 of tool steel, the cutting face 14 of which is cut away obliquely to the axis of the body. The obliquely inclined face 14 is curved transversely about an axis intersecting with the axis of the tool bit body, in oblique relation thereto. As a result, two cutting edges, designated at 16, 18 respectively, are formed upon said face, at diametrically opposite locations on the body, and both of these are compoundly curved. This may be noted by comparing Figs. 2 and 3, wherein it is shown that (Fig. 2) cutting edge 16 is bowed upwardly, following a curvilinear path, and wherein it is shown (Fig. 3) that said cutting edge is also bowed forwardly, again following a curvilinear path. Comparison of Figs. 2 and 4 show that cutting edge 18 is bowed downwardly in Fig. 2, and bowed forwardly in Fig. 4. The expressions "upwardly," "downwardly," and "forwardly," it is understood, are intended to be descriptive of said cutting edges only in the sense in which said cutting edges are illustrated in the several figures of the drawing.

Considering the construction further, reference should be had to Fig. 1, where it is shown that the lip angle LA of the bit is an acute, approximately 65° angle. This angle is that having at its apex the cutting edge 16, said angle being included between a line drawn along the crest of the cutting face 14 and that side surface of the bit at the end of which the cutting edge 16 is provided. The angularity which the crest portion of the face 14 bears to said side surface of the tool bit body can of course be varied, but in practice, it has been found that the specified angle is the one that is best adapted, by reason of the formation of the bit in the manner illustrated, to achieve optimum results.

It follows that the lip angle included between the line drawn along the crest of face 14 and the side surface of the bit body at the end of which cutting edge 18 is disposed, will be approximately 135°.

Further, there is shown in Fig. 1 the relief angle, which for optimum results is approximately 45° and has been designated RA. Still further, the cutting angle CA has been illustrated, this being the total of the relief angle and the lip angle, thus amounting to approximately 110°.

By reason of the construction illustrated and described, not only does the bit have greater efficiency than conventional bits having a plurality of angularly related flat faces, but also, the bit can be ground to its final shape at very low cost as compared to that required in forming the mentioned conventional bits. In the formation of the bits, a highly polished shape of cylindrical cross section is produced in a centerless grinding machine, this applying to the formation of the face 14 as well as to the formation of the body 12, and this can be done at very low cost as compared to the troublesome method presently followed, requiring polishing or lapping of a plurality of flat surfaces. The polishing or lapping of the flat surfaces of conventional bits is of course extremely important, since the smoother such surfaces are polished, the less chance there will be of the formation of a built-up edge. In effect, front clearance, side clearance, and side rake are formed on the tool bit in a single operation, as distinguished from the multiplicity of operations required to provide equivalent characteristics in a conventional tool bit.

Still further, the particular shape of the tool bit, having an edge-defining end surface or cutting face 14 shaped relative to a cylindrical body 12 as illustrated and described, provides tool faces 17, 19 of transversely curved formation adjacent the compoundly curved cutting edges 16, 18 respectively, that eliminate cratering and built-up edge. By the term "tool face" is meant the part of the tool that absorbs the frictional force which the chip creates on its path from its parent metal to the chip disposal area. With respect to these cutting forces, for a given material being turned, or otherwise acted upon, the cutting forces involved may be resolved into the "tangential" or down pressure on the tool; the "radial," or the force tending to push the tool away from the work; and the "longitudinal," or the force necessary to push the tool into the material. The tangential force is exerted by pressure of the chip on the tool, and as previously mentioned influences cratering. The tool thus should be so shaped as to reduce friction between the chip and tool face to a minimum, and at the same time the other forces mentioned must also be absorbed by the tool face. The illustrated construction, it has been found, is particularly well adapted to minimize these forces.

The physical condition of the cutting material and the material being cut, the speed of the tool machine, the feed and depth of the cut, and whether or not a coolant is used also must be taken into consideration in preventing built-up edge and cratering. The higher speeds permissible for given materials are considered less troublesome, since at high speed the chip is weakened by the high temperature at the point of contact of the tool and the material being worked on. Thus, a tool that permits higher cutting speed is to be preferred, since the cutting forces soften the chip and the highly polished faces are better able to overcome the frictional heat at this point. The illustrated construction is particularly adapted to permit high speed operation.

Referring to Figs. 6 and 7, there is here shown the particular adaptability of the tool for performance of its functions both in a positive position shown in Fig. 6, and a negative position shown in Fig. 7. In Fig. 6, by the term "positive position" is meant a condition in which, with the work rotating in the direction of the arrow in Fig. 6, the angle B is an acute angle. Similarly, by the term "negative position" is meant a position of the bit in which, with the work rotating in the direction of the arrow in Fig. 7, the angle A is an obtuse angle.

In the illustrated positive position, the cutting edge 16 engages the work, and as shown, the bit is tilted relative to the work, and it has been found that in view of the particular formation of the surface 14, a still better action results. The same is true of the negatively positioned tool bit shown in Fig. 7.

In Fig. 10, there is shown a fragment of a chip formed by use of the tool bit. As previously noted, the semi-cylindrical cutting face 14 and the multi-curved cutting edge 16 or 18, produce by their combined action a chip of a cross section completely different from that of chips formed when conventional bits are used. The chip as shown has the cross section of a crescent, that is, its top and bottom surfaces are transversely curved about different centers and converge to form the side edges of the chip, the chip being thickest along its longitudinal center line and progressively decreasing in thickness in opposite directions from said center line to the side edges, the edges being perforated or slit along lines extending transversely of the chip by the expanding force with which the chip is lifted from the parent metal, the perforated side edges then curling upwards to impart the final cross-sectional shape to the chip.

Due to this shape and physical characteristic of the chip, the chip relieves the cutting edge and the tool face of frictional heat minimizes the effect of the cutting forces, this being a very important factor in the cutting of steel.

Still another important characteristic of the invention, with respect to the use thereof in positive and negative positions, as well as in a zero position, is the fact that only a single tool is required for both positions, as distinguished from conventional tools which require two different tools having oppositely shaped lip angles.

Yet another feature of importance resides in the fact that a larger radius is permissible for the strengthening of the cutting point where the side cutting edge and front cutting edge are tangent. The larger radius is desirable for cutting radii in corners, deep grooves, or in the cutting of steel, where large cutting radii cause "chatter" when conventional tools having flat faces are used. At the same time, the semi-cylindrical tool face 17 or 19 prevent "hugging" of the chip and so eliminates the stress that causes the "chatter."

Still another feature of importance resides in the particular shape illustrated and described, which is such that the tool will need no grinding of the tool face due to its resistance to built-up edge and cratering. This feature enables the resharpening of the tool to be carried out in a single operation, as distinguished from the multiplicity of operations required when flat-faced tool bits are used.

In Figs. 8 and 9 there is shown a modified tool bit generally designated at 10ª. This has cutting faces 14ª at opposite ends thereof, similar in every respect to the cutting face of the tool bit first described.

This tool bit as shown is particularly adapted for engagement in a holder 24, said holder being provided with a rectangular body having, opening upon one side surface thereof, a longitudinal groove 26 curved through substantially more than 180° to define overhangs on the opposite edges of the groove. On the grooved face of the body of said holder there are provided threaded corner openings at opposite sides of the groove, said corner openings being designated at 28. The grooved face of the holder is adapted to be covered by a flat, rectangular plate 30 having corner openings registering with openings 28 to receive connecting screws 34. The tool bit 10ª is inserted in the groove, fitting snugly therein, and has at one side a flat surface 36 in the plane of the grooved side surface of the holder body. With the tool bit inserted, the plate 30 is attached, and the tool bit is effectively clamped therein so as to be firmly held while the work is being performed.

It will be understood that the tool bit, instead of being formed in a single piece of material, can be provided with carbide inserts to provide the cutting edges 16, 18, and can even have a rectangularly shaped tool bit body, so long as said body, at one end, has an end portion so shaped as to provide the compound curvature of the cutting edges and the tool face and cutting face.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A compound duplex cutting tool bit having a work-engaging cutting edge formed with a compound curvature, said bit including a body at least one end portion of which is cylindrical to impart one of the curves to said edge, the end surface of said portion being curved about an axis angular to the axis of the cylindrical portion to impart a second curvature to said edge, said first-named axis being disposed in oblique relation to the second-named axis, and intersecting with the second-named axis, one curvature being upwardly disposed, the other curvature being downwardly disposed.

2. A compound duplex cutting tool bit comprising a cylindrically shaped body having a part-cylindrical cutting face at at least one end thereof, the axis about which the cutting face is curved being obliquely related to and intersecting with the major axis of the body to form diametrically opposed cutting edges on said cutting face each of which is curved in two directions, said body having a flat surface extending longitudinally thereof to facilitate clamping of the body in an associated holder having a groove of a cross section corresponding to that of the body, said cutting edges being at opposite points on the body, one cutting edge being bowed upwardly following a curvilinear path and also bowed forwardly following a curvilinear path, the other edge being bowed downwardly following a curvilinear path and also bowed forwardly following a curvilinear path.

References Cited in the file of this patent

UNITED STATES PATENTS

| | | |
|---|---|---|
| 1,222,643 | Lovejoy | Apr. 17, 1917 |
| 2,322,408 | Aber | June 22, 1948 |
| 2,502,922 | Bura | Apr. 4, 1950 |